United States Patent

[11] 3,580,993

[72] Inventors Robert E. Sandorf;
Robert A. Hammond, Canton, Ohio
[21] Appl. No. 763,193
[22] Filed Sept. 27, 1968
[45] Patented May 25, 1971
[73] Assignee Diebold, Incorporated
Canton, Ohio

[54] MULTIPLE CAMERA SUPERIMPOSED MESSAGE CLOSED CIRCUIT TELEVISION SYSTEM
4 Claims, 3 Drawing Figs.

[52] U.S. Cl. .......... 178/6, 178/6.8
[51] Int. Cl. .......... H04n 5/22, H04n 7/00, H04n 7/18
[50] Field of Search .......... 178/6 (IND), 6 (F&M), 6 (PD), 6.8

[56] References Cited

UNITED STATES PATENTS

| | | | |
|---|---|---|---|
| 3,366,731 | 1/1968 | Wallerstein .......... | 178/6 |
| 2,172,936 | 9/1939 | Goldsmith .......... | 178/6F&M |
| 2,886,636 | 5/1959 | Grace .......... | 178/6F&M |

*Primary Examiner*—Bernard Konick
*Assistant Examiner*—Howard W. Britton
*Attorney*—Frease and Bishop

ABSTRACT: A closed circuit television system advantageously used in conducting television banking services. The system has a plurality of camera viewed teller stations and a plurality of customer stations equipped with monitors. Any teller camera may be connected selectively with one of a plurality of the monitors. A message camera viewing an advertising message from the bank is incorporated in the system so that the same message is superimposed upon any of the teller camera scenes displayed at any of the customer receivers.

Patented May 25, 1971 3,580,993

INVENTORS
Robert E. Sandorf and
Robert A. Hammond
BY
Frease & Bishop
ATTORNEYS

MULTIPLE CAMERA SUPERIMPOSED MESSAGE CLOSED CIRCUIT TELEVISION SYSTEM

BACKGROUND OF THE INVENTION

1. Field of the Invention

The invention relates to closed circuit television systems such as those used in conducting banking services, for example, wherein there are a plurality of television cameras, one for each of a number of tellers located within a bank. These teller or scene cameras are connected by closed television circuitry selectively with any one of a plurality of television receivers or monitors located at a plurality of customer stations outside the bank. Such closed circuit television equipment is arranged so that the customer at the monitor where the customer is located may see a picture of the teller with whom he is dealing. The teller, through teller controls, connects his particular camera selectively with the particular customer station being served at the moment by the teller.

In accordance with the invention, a particular message, such as an advertising message viewed by a message camera, is superimposed upon each and every of the different teller pictures or scenes displayed at each and every of the customer station television receivers or monitors.

2. Description of the Prior Art

Prior closed circuit television systems used in conducting banking services have included a plurality of teller cameras and a plurality of customer station monitors, and control or switching devices actuated by any one of the tellers selectively for connecting a particular teller camera to a selected customer monitor.

Prior commercial broadcasting and receiving systems have provided a camera taking a picture of a newscaster, for example, and a second camera taking a picture of a message such as a weather warning to be superimposed on the newscaster's picture. The newscaster and warning camera outputs have been combined and broadcast so that the combined picture is received by a receiver in the home of one of the general public. Thus, this prior commercial system superimposes a message (weather warning) on one and only one scene (newscaster) and broadcasts the superimposed message and scene pictures to the home receiving monitors. Such commercial television systems accomplishing such superimposed picture broadcasts involve very complex electronic circuitry and components.

None of these prior closed circuit or commercial broadcast television systems have provided, one and the same picture or message superimposed upon each of a plurality of different pictures or scenes viewed by a plurality of cameras and displayed at the same time, one message and different scenes respectively, at a plurality of monitors or receivers.

SUMMARY OF THE INVENTION

Objectives of the invention include providing equipment which can display a selected or particular message or advertisement to a banking customer while his attention is held during the time that such customer is engaged in a banking operation involving the use of closed circuit television equipment; providing for the display of the particular message at each and every one of the customer monitors or receivers whenever the customer at any particular monitor is viewing the picture displayed at his monitor of the particular teller with whom such customer is conducting a banking operation; providing for such message display by the simple addition of simple electronic circuitry and components to typical multiple camera-multiple receiver closed circuit television systems; and providing a new closed circuit television system, eliminating complicated equipment heretofore required, which achieves the indicated objectives simply, effectively and inexpensively, and solves problems and satisfies existing needs.

These objectives and advantages are obtained by the multicamera, multireceiver closed circuit television system, the general nature of which may be stated as including a plurality of teller or scene cameras each viewing a different scene; a message camera viewing a particular message to be displayed; means for combining the output of the message camera with the outputs of each of the scene cameras; a plurality of television receivers; means for feeding the combined output signals of the message camera and one of the scene cameras to one of the plurality of receivers simultaneously with the feeding of the output signals of the message camera and another scene camera to another of the plurality of receivers, whereby the same message is displayed at a plurality of receivers simultaneously superimposed on two different pictures; and synchronizing signal generator means controlling the horizontal frequency of the message camera and all of the scene cameras to be at the same rate.

BRIEF DESCRIPTION OF THE DRAWING

A preferred embodiment of the invention —illustrative of the best mode in which applicants have contemplated applying the principles —is set forth in the following description and shown in the drawing and which is particularly and distinctly pointed out and set forth in the appended claims.

Similar numerals refer to similar parts throughout the drawing.

Figure 1:
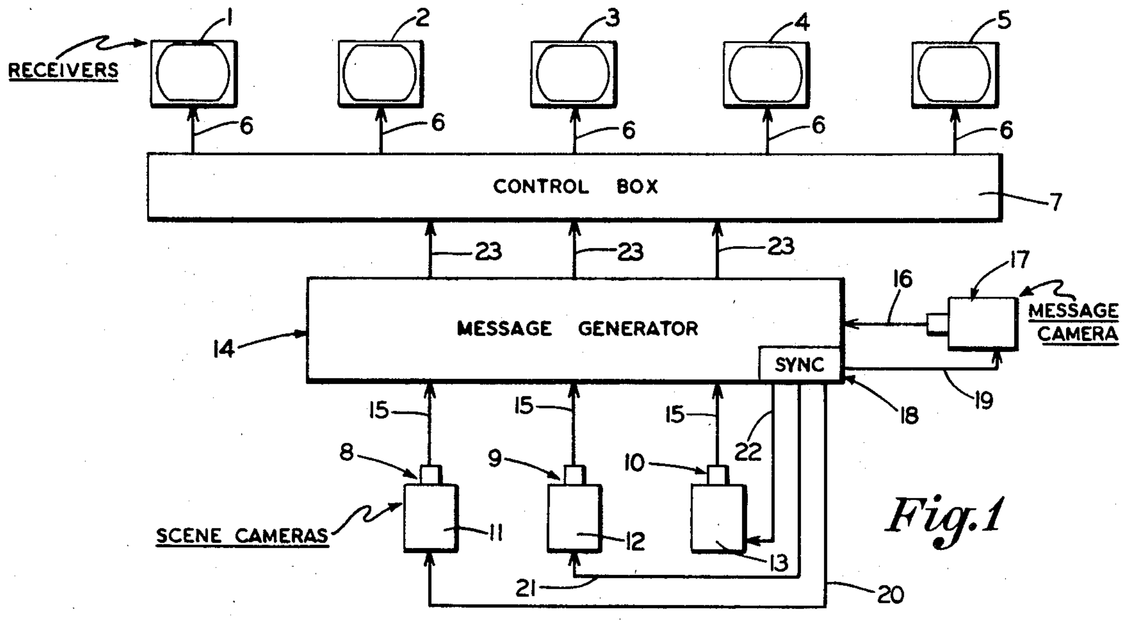
FIG. 1 of the drawing is a general block diagram illustrating the new equipment.

Closed circuit television systems are used extensively as a part of television banking equipment wherein television receivers or monitors are located at a plurality of customer stations served by a plurality of tellers located within a bank at a plurality of teller stations. Each teller station is equipped with a teller or scene camera. An audio system also is provided between the teller and customer stations. Conveyor means, such as a pneumatic tube system, extends between the teller and customer stations so that a carrier may be dispatched between the teller and customer stations for transporting banking media between the stations.

In accordance with the invention, television receivers are located at each of a plurality of say five customer stations, indicated at 1, 2, 3, 4, and 5 in the drawing. Each receiver is connected by cable 6 with control box 7 containing control means which may be actuated by a switch or button at each teller station generally indicated at 8, 9, and 10 where the teller or scene cameras 11, 12, and 13 are located. A teller at any of stations 8, 9, and 10 may connect the output of the scene camera at his station with any of the customer receivers 1, 2, 3, 4, or 5 by actuating the control box circuitry in the usual manner.

In accordance with the invention, message generator circuitry, which may be contained in the message generator generally indicated at 14, is introduced into the closed circuit system by connecting cables 15 and message generator 14 with cameras 11, 12, and 13. A message camera 17 also is connected by cable 16 with message generator 14.

Furthermore, synchronizing signal generator (horizontal) circuitry generally indicated at 18 controls the output of message camera 17 and scene cameras 11, 12, and 13 through connections 19, 20, 21, and 22, respectively, between the synchronizing signal generator 18 and the message and scene cameras 17, 11, 12 and 13, so that the horizontal frequency of the cameras are of the same rate.

The different scene or picture taken by any of the scene cameras of a teller at any of the teller stations 8, 9, or 10 thus is transmitted through message generator 14 and through cables 23 between message generator 14 and control box 7 from any teller station to any receiver 1, 2, 3, 4, or 5 selected by the teller. At the same time, the message viewed by message camera 17 and fed to message generator 14 and controlled by synchronizing generator 18 is superimposed upon each and any of the different pictures viewed by any of scene cameras 8, 9, and 10 and transmitted to any particular receiver or monitor 1, 2, 3, 4, or 5.

Figure 3:
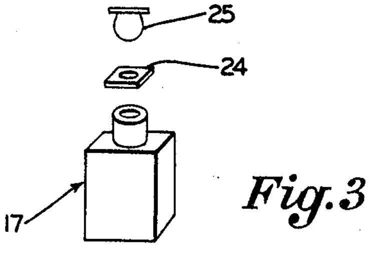
FIG. 3 is a diagrammatic view of the message camera.

Referring to FIG. 3, the message viewed by message camera 17, such as an advertisement or message concerning the bank, may be contained on a slide or transparency indicated at 24 in FIG. 3 suitably illuminated by a light source 25. The particular transparency 24 containing a particular message to be superimposed on the different scenes transmitted to any of the receivers 1, 2, 3, 4, or 5 may be changed from time to time, such as daily or hourly changes, by inserting a different transparency 24 into a holder therefor, so that the message may be viewed by message camera 17.

Figure 2:
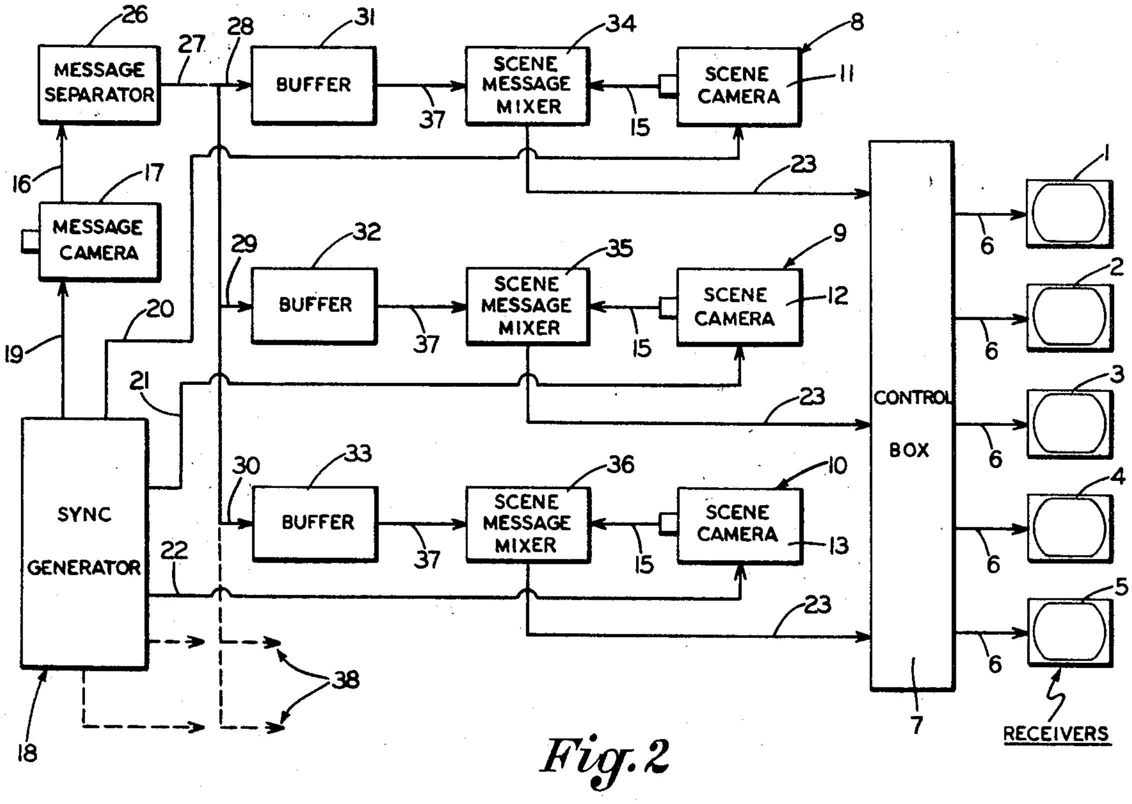
FIG. 2 is a more detailed block diagram of the equipment.

The system is indicated more in detail in FIG. 2. Synchronizing signals and electronic video information signals pass from message camera 17 through cable 16 to a message separator 26 which forms a part of message generator 14. Message separator 26 functions only to pass the electronic video information signal outputs from message camera 17, and to eliminate vertical and horizontal synchronizing signals. The electronic video signals of the message then feed from message separator 26 through cable 27 and branches 28, 29, and 30, respectively, to buffer means 31, 32, and 33 corresponding, respectively, to scene cameras 11, 12, and 13. Buffers 31, 32, and 33 include an impedance matching circuit that enables the output of the message separator 26 to be fed to mixer circuits.

The outputs of buffers 31, 32, and 33 in turn are fed to scene-message mixers 34, 35, and 36 through cables 37. Mixer units 34, 35, and 36, respectively, receive the electronic video signal outputs of scene cameras 11, 12, and 13, respectively, through cables 15. The buffer circuitry of units 31, 32, and 33 and the mixer circuitry of units 34, 35, and 36 also form parts of message generator 14 along with the message separator 26. Synchronizing generator 18, also is associated with the message generator 14.

Scene-message mixers 34, 35, and 36 are usual electronic mixer circuits for combining electronic signals from different sources.

The electronic signal outputs of mixers 34, 35, and 36 in each instance comprise combined electronic signals emanating from the particular scene camera connected with a particular mixer and emanating from the message camera 17.

These combined electronic signal outputs of mixers 34, 35, and 36 then are fed in the usual manner to control box 7 through cables 23 and thence from any one of mixers 34, 35, or 36 to the particular monitor 1, 2, 3, 4, or 5 to which the particular mixer is intended to be connected. These signals or combined electronic signal outputs of the mixers contain only video information from the message camera 17 and video information and synchronizing signals from the scene cameras 11, 12, or 13.

The scene cameras 11, 12, and 13 and message camera 17 maintain vertical synchronization by virtue of the fact that vertical synchronizing signals for these units are derived from the AC power supply frequency. In this connection, it is noted that the scene cameras 11, 12, and 13 feed electronic video signals and both horizontal and vertical synchronizing signals to their respective mixers 34, 35, or 36.

It is important that, and the system requires that the vertical frequencies of all of the cameras 11, 12, 13, and 17 are of the same rate, and that the horizontal frequencies of all of said cameras also are of the same rate. This is achieved as indicated, by controlling the horizontal frequencies of all cameras by the synchronizing signal generator 18 while the vertical synchronizing signals are derived from the AC power frequency.

In the drawings, five receivers 1, 2, 3, 4, and 5 are illustrated for example. Additional receivers if desired may be added to the system. Similarly, only three scene cameras 11, 12, or 13 are illustrated. However, additional scene cameras and mixers and buffers associated therewith may be added to the system, as indicated by the dotted lines 38 in FIG. 2. Normally, in the installation of television banking equipment, three tellers may serve five customer stations which is the reason for illustrating three scene cameras and five receivers.

Regardless of the number of cameras and receivers involved, in accordance with the concept of the invention, one and the same message (which may be changed from time to time by changing the transparency 24) is combined with the different scene outputs of all of the scene cameras, such as units 11, 12, and 13, and displayed at any receiver 1, 2, 3, 4, or 5. The scenes displayed at different receivers are different but the message superimposed thereon is the same.

The concept of the invention is characterized by its simplicity in that simple or standard cameras may be used in equipping a television banking installation, not only as the scene cameras but also as the message camera. Simple or standard receivers also are used. Simple electronic circuitry components also are used to provide the message separator 26, the buffers 31, 32, and 33, and the mixers 34, 35, and 36.

Thus, the cost of equipping and installing the described multiple camera superimposed message closed circuit television system of the invention is extremely low as compared with the costs of the complicated components and circuitry of prior art commercial equipment wherein one camera is provided supplying a message to one news broadcaster camera, for example, to provide a combined signal which is broadcast over the air.

Furthermore, in accordance with the concept of the invention, a closed circuit television system is provided for viewing a plurality of different scenes and transmitting and selectively displaying at different receivers said different scenes, each with one and the same superimposed message.

Thus, the improved closed circuit television system is very simplified and provides an effective arrangement by which a simple message may be superimposed on different pictures or scenes originating from a plurality of cameras, and transmitted by closed circuit to selected monitors or receivers thus to display the different scenes selectively each with the same message superimposed thereon. Furthermore, the improved system eliminates costly arrangements heretofore required for superimposing one picture upon another and achieves the objectives and solves problems that have existed in the art.

In the foregoing description, certain terms have been used for brevity, clearness and understanding; but no necessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described. For example, film strips or movie films to picture a message may replace the transparency 24 in combining a message with any scene.

Having now described the features, discoveries and principles of the invention, the manner in which the improved system is combined and functions, the characteristics of the new arrangement, and the advantageous, new and useful results obtained; the new and useful structures, devices, elements, arrangements, parts, combinations and systems, and mechanical equivalents obvious to those skilled in the art are set forth in the appended claims.

We claim:

1. In a multiple-camera, multiple-receiver, closed circuit television system, a plurality of scene cameras each viewing a scene different from that viewed by any other scene camera; a message camera viewing a particular message to be displayed superimposed on each of the different scenes viewed by said scene cameras; means for combining the output signal of the message camera with the output signals of each of the scene cameras; a plurality of television receivers; means for feeding the combined output signals of the message camera and one of the scene cameras to one of the receivers; means for feeding the combined output signals of the message camera and another one of the scene cameras to another one of the receivers; and synchronizing signal generator means controlling the horizontal frequency of the message camera signal and all of the scene camera signals to be the same.